United States Patent [19]

Titus

[11] Patent Number: 5,035,922
[45] Date of Patent: Jul. 30, 1991

[54] REDUCED J-TUBE RISER PULL FORCE

[75] Inventor: Paul E. Titus, Houston, Tex.

[73] Assignee: Shell Oil Company, Houston, Tex.

[21] Appl. No.: 101,042

[22] Filed: Sep. 25, 1987

Related U.S. Application Data

[63] Continuation-in-part of Ser. No. 876,152, Jun. 19, 1986, abandoned, and a continuation-in-part of Ser. No. 876,153, Jun. 19, 1986, abandoned.

[51] Int. Cl.$^5$ .................. F16L 1/18; C10M 111/02; C10N 40/00; F16N 15/00
[52] U.S. Cl. ............................ 427/239; 427/230; 427/235; 252/9
[58] Field of Search ............... 427/230, 235, 239; 252/9

[56] References Cited

U.S. PATENT DOCUMENTS

| | | | |
|---|---|---|---|
| 4,039,717 | 8/1977 | Titus | 427/239 |
| 4,098,091 | 7/1978 | Desai et al. | 405/169 |
| 4,137,623 | 2/1979 | Taylor | 427/239 X |
| 4,169,187 | 9/1979 | Glazar | 427/239 X |
| 4,321,308 | 3/1982 | Jannke | 427/435 X |
| 4,373,870 | 2/1983 | Sandgren et al. | 427/435 X |
| 4,514,443 | 4/1985 | Kostecki | 427/230 |
| 4,523,877 | 6/1985 | Finn et al. | 405/195 |
| 4,526,813 | 7/1985 | Wu | 427/235 |
| 4,556,580 | 12/1985 | Kamuro et al. | 427/230 X |

OTHER PUBLICATIONS

Chemical Abstracts, 87(18); 136,943p, 1977.

Primary Examiner—Thurman Page
Assistant Examiner—E. J. Webman

[57] ABSTRACT

A method is provided for reducing the force required to move a pipe through a J-tube attached to an offshore platform by coating the pipe with hydrophilic polymer and then moving the pipe through the J-tube, or by introducing a solution of hydrophilic polymer and water into the J-tube and then moving the pipe through the J-tube.

2 Claims, 1 Drawing Sheet

REDUCED J-TUBE RISER PULL FORCE

REFERENCE TO RELATED APPLICATIONS

This application is a continuation-in-part of application Ser. Nos. 876,152 and 876,153, both filed June 19, 1986 both now abandoned. Application Ser. No. 101,041, filed Sept. 25, 1987 now abandoned is relevant to this application.

BACKGROUND OF THE INVENTION

This invention pertains to the use of J-tubes on offshore platforms for installing pipelines extending upwardly from the seafloor.

In offshore petroleum operations, a platform frequently serves as an operational base and a production terminal for oil and gas wells. A problem common to all such offshore platforms is providing a connection from an above-water facility to a pipeline which lies on the seafloor. A typical method of providing the connection is the use of a J-tube riser guide member which is a continuous tubular structure having the shape of a J and through which a riser pipeline is pulled from the seafloor to the above-water facility. This J-tube runs down along the length of the platform, bends near the seafloor and thus runs generally parallel to the seafloor a short distance. The lower end of the J-tube frequently includes a flared portion referred to as a bell mouth. The upwardly pulled pipeline, i.e., the riser, provides a fluid flow path from the above-water facility to the pipeline on the seafloor.

At least two basic methods as known for installing the pipeline riser in the J-tube once the J-tube is positioned. In the so-called J-tube method, the riser is inserted in the seafloor end of the tube and pulled through it with a cable or other means. In the so-called reverse J-tube method, a section of the riser is inserted in the deck end of the tube and is pulled or pushed down through it as additional sections of conduit are joined to the riser at the deck. Both of these methods place stresses on the riser as it is forced through the J-tube. These stresses may cause displacement to the riser and J-tube which produce strains that exceed the limits of the materials and cause damage to the riser or J-tube.

Unfortunately, the J-tube is generally useful for riser pipeline diameters only up to about 12 inches. For riser pipelines having a diameter greater than 12 inches, the high pulling force required to install the riser is a major deterrent to further use of the J-tube. The J-tube has the advantage of a controlled and simple installation process which does not require elaborate pipeline manipulating equipment, unlike other known installation processes.

Accordingly, it is a purpose of the present invention to provide a J-tube which has all the advantages of the conventional J-tube and which can be utilized with pipeline diameters greater than 12 inches without placing undue stresses upon the pipline or the J-tube.

Applicant is not aware of any prior art references which, in his judgement as one skilled in the pipeline art, would anticipate or render obvious the instant invention; however, for the purposes of developing the background of the invention and establishing the state of the requisite art, the following are set forth; U.S. Pat. Nos. 4,098,091, 4,523,877, 4,106,063 and 4,039,717.

SUMMARY OF THE INVENTION

The present invention provides a J-tube through which a pipeline can be moved by a reduced force. This is accomplished by providing the J-tube with a slippery coating.

Accordingly, the present invention provides a method for reducing the force required to move a pipe through a J-tube attached to an offshore platform comprising coating the pipe exterior and/or the J-tube interior with a hydrophilic polymer, or introducing a solution of a hydrophilic polymer and water into the J-tube, and then moving the pipe through the J-tube. Preferably, the hydrophilic polymer is carboxymethyl cellulose or polyacrylamide. Also preferably, the polymer is incorporated as a solid into the abraded surface of the pipe and/or J-tube, either as a part of the basic material of the abraded surface or as a coating such as a corrosion coating, e.g. hydrophilic polymer mixed with a rubber coating or as part of a liquid epoxy paint or coating. In another preferred embodiment, the polymer solution is introduced at least the top of the J-tube or may be pumped onto the surface of the pipe as the pipe is passed into the J-tube or is introduced into the J-tube at least near the bottom of the J-tube.

The slippery coating or surface produced by the hydrophilic polymer and water or a water substitute may be neutralized or made less slippery by addition of a trivalent metal salt such as aluminum sulfate to the coating or surface.

Water substitutes such as polyols, preferably light polyols, e.g. glyerol, may be used instead of water to produce a slippery coating or surface when combined with hydrophilic polymer.

Other purposes, distinctions over the art, advantages and features of the invention will be apparent to one skilled in the art upon review of the following.

DESCRIPTION OF PREFERRED EMBODIMENTS

Figure 1:
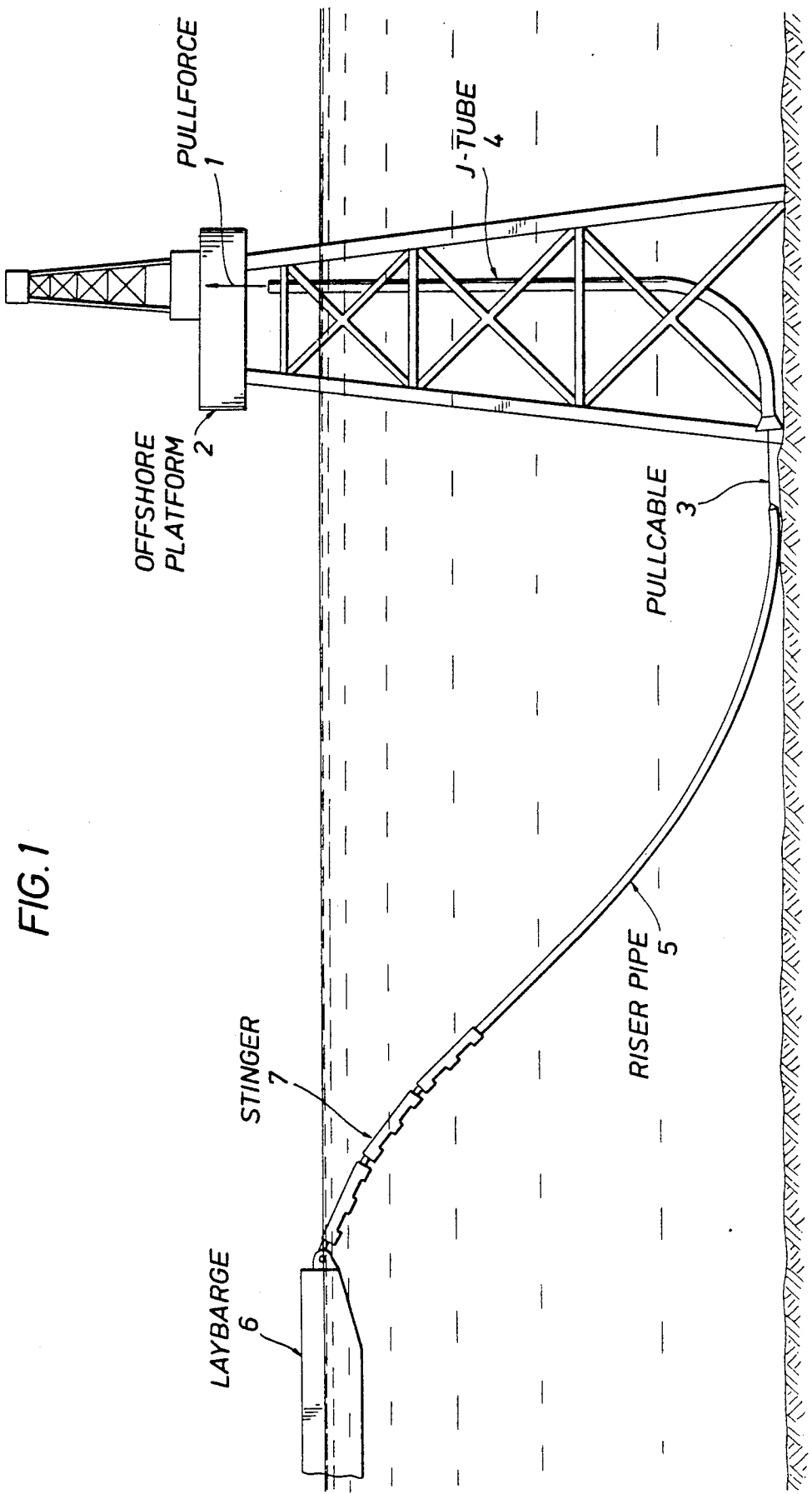
FIG. 1 depicts an initiating J-tube riser method of connecting a pipeline to a fixed offshore platform.

Presently, a widely used way to bring an offshore pipeline up to a producing platform is to pull the pipe up through a casing attached to a leg of the platform. The casing is angled from the vertical through an arc to the horizontal on the seafloor roughly forming the letter J and thus is called the J-tube.

During the pull, extensive forces are required to overcome the resistance due to pipe deformation and pipe-to-casing friction. Depending on the final disposition of the finished pipeline, the pipe passing up through the J-tube may be coated with a corrosion-resistant coating, and because of the relatively high pull forces, an especially thick, tough, abuse-resistant coating must be used instead of the cheaper, more easily applied conventional pipeline coatings. The present invention provides a method by which the pull forces are reduced, making the process cheaper, safer, easier and thus also reducing the need for a thick, tough, abuse-resistant protective coating (when such a coating is required). This method includes the admixture or application of or the addition of solutions of relatively high molecular weight hydrophilic polymers such as carboxymethyl cellulose and polyacrylamide and the like to a corrosion coating of the pipe that is pulled and/or pushed or, in the case of solutions, added to the J-tube either before or during the pipe pull and/or push. These polymers in relatively small quantities, for example less than 10% by weight, have the characteristic of imparting a lubricity to water, thus significantly reducing the friction of the pipe as it passes through the J-tube. In the case of a solution application, the polymer/water solution can be made up (0.5%w to 2%w polymer) and the J-tube filled with the material prior to the pull. Alternatively, a more concentrated solution (2%w to 10%w) or under some conditions (1%w to 10%w) may be pumped and injected onto the pipe surface just as it enters the J-tube. In the case of a coating application, the powdered polymer may be impregnated on the surface of the pipeline, e.g. into a coating, preferably prior to makeup of the pipe, such that maximum benefit is achieved during movement of the pipe through the J-tube. Also, the powdered polymer may be applied mixed with an outside elastomeric layer (e.g. vulcanized or unvulcanized rubber or rubber cement) or applied as part of a paint (e.g. epoxy liquid paint).

Where the polymer is incorporated as a solid into the abrading surfaces of the J-tube and/or riser, either as part of the basic material or as a coating, when water or water substitute is introduced into, on or around the abrading materials, the polymer hydrates, giving a very slippery, viscid, pituitous surface. Since the polymer is within the abrading surface or surfaces to a finite depth, it is constantly being replenished as needed. When the polymer is incorporated into the base material, powdered polymer is added to the material while the material is being fabricated. For example, the polymer may be incorporated into polyethylene, polypropylene, and other materials not requiring high temperature fabrication (e.g. <350° F.). For extreme physical abuse, the finely divided water-hydratable polymer is incorporated into the pores or Grooves of a metal surface such that it is protected and released as needed. In this case, the pores may exist as surface roughness (e.g. a sand blasted surface) or as deep pores such as encountered in sintered metal or fine mesh screens or as grooves. The solid water-hydratable polymer may be further protected in the pores or grooves by being injected as part of a mixture with a thermoplastic or thermosetting polymer, such as polyethylene or epoxy, respectively.

In yet another embodiment, the finely divided water-hydratable polymer is introduced into the abrading surfaces of the J-tube and/or riser encapsulated in a water insoluble matrix (e.g. mixed into epoxy, then ground into a powder). In this case, the lubricating polymer is released only as the encapsulant is crushed or otherwise broken by the abrading surfaces. In all of the above cases, water or water substitute is needed to fully achieve lubricity. Broadly, the unique concept behind the invention is to bring a replenishing source of lubricity to the location where it is most needed.

The slippery coating or surface produced by the present invention may be neutralized or at least made less slippery by reaction with or addition to the coating or surface of a trivalent metal salt. Aluminum, chromium or iron salts such as sulfates or acetates are preferred. Most preferred are aluminum sulfate and aluminum acetate. The neutralizing step is particularly desirable, for example, where slippery coating has been spilled on the deck of a pipelay barge and it is desired to neutralize the coating or surface or make the coating or surface less slippery.

Water substitutes such as polyols may be utilized with the invention in lieu of water. Light polyols are preferred substitutes. Most preferred is glycerol. In some instances use of the water substitute may result in a more slippery coating or surface.

The invention is most useful in connection with an offshore bottom founded platform having legs which maintain an above-water facility above water level and which rests firmly on the seafloor. A J-tube, e.g. as known to the art, preferably extends upwardly from the seafloor to the above-water facility. By a pulling and/or pushing method as shown in FIG. 1, a pipe is inserted within the J-tube in a known manner to realize the benefits of the invention. A pullforce 1 applied at the topside of an offshore platform 2 to pullcable 3 passing through J-tube 4, is operative to force riser pipe 5 through the J-tube. The riser pipe, in one embodiment, is supplied from a laybarge via stinger 7.

The foregoing description of the invention is merely intended to be explanatory thereof. Various changes in the details of the described method and apparatus may be made within the scope of the appended claims without departing from the spirit to the invention.

What is claimed is:

1. A method for reducing the force required to move a pipe through a J-tube attached to an offshore platform, comprising:
    covering the pipe with at least one of (a) a slippery coating and (b) a slippery surface, each comprising hydrophilic polymer;
    reacting a polyol with the hydrophilic polymer to make the hydrophilic polymer slippery; and
    moving the pipe through the J-tube attached to the off-shore platform.

2. The method of claim 1 wherein the polyol is glycerol.

* * * * *